United States Patent
Gruber et al.

(10) Patent No.: US 9,043,634 B2
(45) Date of Patent: May 26, 2015

(54) METHODS, SYSTEMS, APPARATUSES, AND COMPUTER-READABLE MEDIA FOR WAKING A SLIMBUS WITHOUT TOGGLE SIGNAL

(75) Inventors: Hans Georg Gruber, San Diego, CA (US); Julio Arceo, San Diego, CA (US); Magesh Hariharan, San Diego, CA (US); Suren Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 13/426,374

(22) Filed: Mar. 21, 2012

(65) Prior Publication Data
US 2012/0278646 A1    Nov. 1, 2012

Related U.S. Application Data

(60) Provisional application No. 61/481,042, filed on Apr. 29, 2011.

(51) Int. Cl.
*G06F 1/04*     (2006.01)
*G06F 13/42*    (2006.01)
(Continued)

(52) U.S. Cl.
CPC ........ *G06F 13/4291* (2013.01); *G06F 11/1658* (2013.01); *G06F 1/04* (2013.01); *G06F 11/0763* (2013.01)

(58) Field of Classification Search
CPC . G06F 11/07; G06F 11/0703; G06F 11/0763; G06F 11/1658; G06F 11/1675; G06F 13/405; G06F 13/4059; G06F 13/4282; G06F 13/4295; G06F 1/04; G06F 1/12; G06F 13/4291

USPC ......................................................... 713/600
See application file for complete search history.

(56) References Cited

U.S. PATENT DOCUMENTS 3,729,586 A     4/1973  Chow
3,831,142 A *   8/1974  Fletcher et al. ............... 714/789
(Continued)

FOREIGN PATENT DOCUMENTS

CA      1307352 C   9/1992
CA      2027334 C   6/2000
(Continued)

OTHER PUBLICATIONS

International Search Report and Written Opinion—PCT/US2012/035428—ISA/EPO—Sep. 13, 2012.
(Continued)

*Primary Examiner* — Thomas Lee
*Assistant Examiner* — Danny Chan
(74) *Attorney, Agent, or Firm* — Howard Seo

(57) ABSTRACT

Arrangements for restarting data transmission on a serial low-power inter-chip media bus (SLIMbus) are presented. A clock signal may be provided in an active mode to a component communicatively coupled with the SLIMbus. Immediately prior to the clock signal in the active mode being provided, the clock signal may have been in a paused mode. While the clock signal was in the paused mode at least until the clock signal is provided in the active mode, the data line may have been inactive (e.g., a toggle on the data line may not have been present). Frame synchronization data for a frame may be transmitted. The frame synchronization data for the frame, as received by the component, may not match expected frame synchronization data. Payload data may be transmitted as part of the frame to the component, wherein the payload data is expected to be read properly by the component.

24 Claims, 7 Drawing Sheets

(51) Int. Cl.
G06F 11/16 (2006.01)
G06F 11/07 (2006.01)

(56) References Cited

U.S. PATENT DOCUMENTS

| | | |
|---|---|---|
| 4,691,280 A | 9/1987 | Bennett |
| 5,179,663 A | 1/1993 | Iimura |
| 5,369,749 A | 11/1994 | Baker et al. |
| 5,533,039 A * | 7/1996 | Boyer .......... 714/819 |
| 5,623,677 A | 4/1997 | Townsley et al. |
| 5,710,775 A * | 1/1998 | Nakayasu .......... 714/704 |
| 5,903,775 A | 5/1999 | Murray |
| 6,094,700 A | 7/2000 | Deschepper et al. |
| 7,197,589 B1 | 3/2007 | Deneroff et al. |
| 7,200,692 B2 | 4/2007 | Singla et al. |
| 7,752,374 B2 | 7/2010 | Cassidy |
| 7,848,232 B2 | 12/2010 | Loffink et al. |
| 7,849,245 B2 | 12/2010 | Travis |
| 7,903,642 B2 | 3/2011 | Voutilainen et al. |
| 8,413,006 B1 * | 4/2013 | Mok et al. .......... 714/752 |
| 2002/0091826 A1 | 7/2002 | Comeau et al. |
| 2004/0059862 A1 | 3/2004 | Chan |
| 2004/0225805 A1 | 11/2004 | Vasudevan |
| 2005/0027904 A1 | 2/2005 | Khawand et al. |
| 2005/0080944 A1 | 4/2005 | Tomitsuka et al. |
| 2005/0148358 A1 | 7/2005 | Lin et al. |
| 2006/0179145 A1 | 8/2006 | Khawand |
| 2008/0215781 A1 | 9/2008 | Lee et al. |
| 2009/0141654 A1 | 6/2009 | Voutilainen et al. |
| 2009/0313408 A1 | 12/2009 | Yanagawa |
| 2010/0191995 A1 * | 7/2010 | Levy et al. .......... 713/323 |
| 2011/0007680 A1 | 1/2011 | Kadous et al. |
| 2011/0280204 A1 | 11/2011 | Nourbakhsh et al. |
| 2011/0320841 A1 * | 12/2011 | Sinha .......... 713/323 |
| 2012/0278518 A1 | 11/2012 | Gruber et al. |
| 2013/0019038 A1 | 1/2013 | Gruber et al. |

FOREIGN PATENT DOCUMENTS

| | | |
|---|---|---|
| CN | 101710737 A | 5/2010 |
| CN | 201535874 U | 7/2010 |
| CN | 103530247 A | 1/2014 |
| EP | 2738681 A1 | 6/2014 |
| JP | S6125395 A | 2/1986 |
| JP | H0329043 A | 2/1991 |
| JP | H05276178 A | 10/1993 |
| JP | 2004525579 A | 8/2004 |
| JP | 2005518252 A | 6/2005 |
| JP | 2010034809 A | 2/2010 |
| JP | 2010263321 A | 11/2010 |
| JP | 2014508597 A | 4/2014 |
| KR | 970002412 B1 | 3/1997 |
| WO | 02088967 A1 | 11/2002 |
| WO | 03072160 A2 | 9/2003 |
| WO | 2010055347 A1 | 5/2010 |

OTHER PUBLICATIONS

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Decaluwe J., et al., "Interprocessor Communication in Synchronous Multiprocessor Digital Signal Processing Chips", Acoustics, Speech and Signal Processing, IEEE Transactions on , vol. 37, No. 12, Dec. 1989, pp. 1816-1828.

Jagadish N., et al., "An Efficient Scheme for Interprocessor Communication using Dual-Ported RAMs", Micro, IEEE , vol. 9, No. 5, Oct. 1989, pp. 10-19.

Sakai S., et al., "RICA: Reduced Interprocessor-Communication Architecture—Concept and Mechanisms", Parallel and Distributed Processing, 1993. Proceedings of the Fifth IEEE Symposium on , Dec. 1-4, 1993, pp. 122-125.

Zhang X, "System Effects of Interprocessor Communication Latency in Multicomputers", Micro, IEEE , vol. 11, No. 2, Apr. 1991, pp. 12-15, 52-55.

* cited by examiner

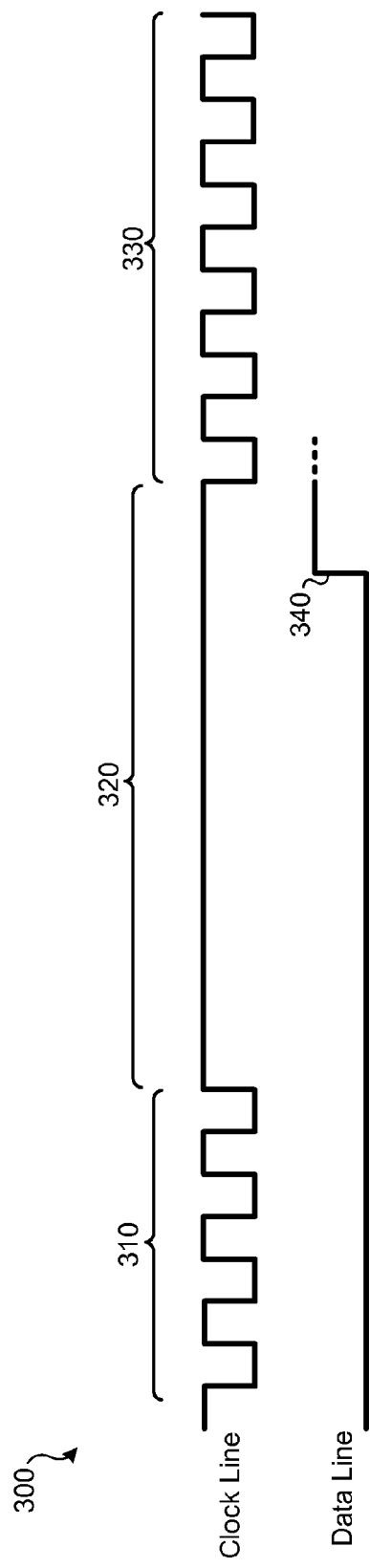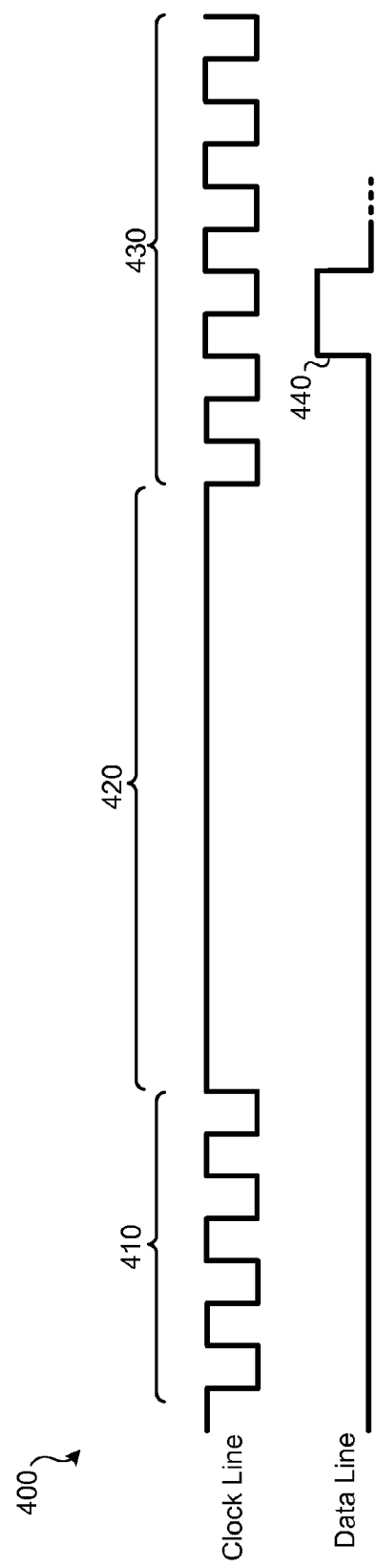

METHODS, SYSTEMS, APPARATUSES, AND COMPUTER-READABLE MEDIA FOR WAKING A SLIMBUS WITHOUT TOGGLE SIGNAL

CROSS-REFERENCES

This application claims priority to U.S. Provisional Patent Application No. 61/481,042, filed Apr. 29, 2011, entitled "Systems and Methods for Waking a Media Bus,". This provisional application is hereby incorporated by reference for all purposes.

This application is related to U.S. application Ser. No. 13/352,163, filed Jan. 17, 2012, entitled "Multiple SlimBUS Controllers for SLIMbus Components". This application is related to U.S. application Ser. No. 13/281,329, filed Oct. 25, 2011, entitled "Non-ported Generic Device". Each of these applications is hereby incorporated by reference for all purposes.

BACKGROUND

Some systems that communicate using a serial data bus, such as a Serial Low-power Inter-chip Media Bus (SLIMbus), may have multiple clock modes. For example, a paused clock mode and an active clock mode may be modes that can be used by the serial data bus. When in a paused clock mode, a clock line of the serial data bus may remain in a steady state and the data line of the serial data bus may not be used to transmit data between components of the system. In an active clock mode, a clock signal may be present on the clock line, and data may be at least sporadically transmitted between components of the system via the data line. In order to determine when the state of the serial data bus should be switched from the paused clock mode to the active clock mode, the data line may be monitored for a toggle. The presence of the toggle may serve to trigger the serial data bus to enter active clock mode. However, in some situations, toggling the data line may not be preferable.

SUMMARY

Various methods, systems, apparatuses, and computer programs are presented for restarting data transmission on a serial low-power inter-chip media bus. An example of a method for restarting data transmission on a serial low-power inter-chip media bus (SLIMbus) may be presented. The method may include providing a clock signal in an active mode, via a clock line, to a component communicatively coupled with the SLIMbus. The SLIMbus may comprise the clock line and a data line Immediately prior to the clock signal in the active mode being provided, the clock signal may be in a paused mode. While the clock signal was in the paused mode, at least until the clock signal is provided in the active mode, the data line may be inactive. The method may include transmitting inaccurate frame synchronization data for a first frame transmitted once the clock signal is provided in the active mode, wherein the inaccurate frame synchronization data for the first frame, as received by the component, does not match expected frame synchronization data. The method may include transmitting payload data as part of the first frame to the component, wherein the payload data is expected to be successfully read by the component.

Embodiments of such a method may include one or more of the following: The method may include reading, by the component, the inaccurate frame synchronization data for the first frame from the data line, wherein the inaccurate frame synchronization data does not match the expected frame synchronization data. The method may include processing, by the component, the payload data of the first frame. A first bit of the inaccurate frame synchronization data, as read by the component, may be unexpected as compared with a first bit of the expected frame synchronization data. Transmitting the inaccurate frame synchronization data for the first frame may include transmitting a second bit, a third bit, and a fourth bit of the expected frame synchronization data. A synchronization tolerance of the SLIMbus may permit incorrect frame synchronization data to be received by the component and the payload data of the frame to be processed. The clock signal in the active mode may be provided by a framer communicatively coupled with the SLIMbus. The method may include determining data to be transmitted to the component is present within a message buffer, wherein providing the clock signal in the active mode, via the clock line, to the component communicatively coupled with the SLIMbus occurs at least partially due to determining data is present within the message buffer.

An example of a system configured for restarting data transmission on a serial low-power inter-chip media bus (SLIMbus) may be presented. The system may include a data line of the SLIMbus. The system may include a clock line of the SLIMbus. The system may include a component communicatively coupled with the data line and the clock line of the SLIMbus. The system may include a framer communicatively coupled with the clock line and the data line of the SLIMbus. The framer may be configured to provide a clock signal in an active mode, via the clock line, to the component communicatively coupled with the SLIMbus Immediately prior to the clock signal in the active mode being provided, the clock signal may be in a paused mode. While the clock signal was in the paused mode, at least until the clock signal is provided in the active mode, the data line may be inactive. The framer may be configured to transmit inaccurate frame synchronization data for a first frame transmitted once the clock signal is provided in the active mode, wherein the inaccurate frame synchronization data for the first frame, as received by the component, does not match expected frame synchronization data. The framer may be configured to transmit payload data as part of the first frame to the component, wherein the payload data is expected to be successfully read by the component.

Embodiments of such a system may include one or more of the following: The component may be configured to read the inaccurate frame synchronization data for the first frame from the data line, wherein the inaccurate frame synchronization data does not match the expected frame synchronization data. The component may be further configured to process the payload data of the first frame. A first bit of the inaccurate frame synchronization data, as read by the component, may be unexpected as compared with a first bit of the expected frame synchronization data. The framer may be configured to transmit the inaccurate frame synchronization data for the first frame comprises the framer being configured to transmit only a second bit, a third bit, and a fourth bit of the expected frame synchronization data. A synchronization tolerance of SLIMbus may permit incorrect frame synchronization data to be received by the component and the payload data of the frame to be processed. The system may include a message buffer communicatively coupled with the framer, wherein the framer is further configured to determine when data to be transmitted to the component is present within the message buffer, wherein the framer being configured to provide the clock signal in the active mode occurs at least partially due to the framer determining data is present within the message buffer.

An example of an apparatus for restarting data transmission on a serial low-power inter-chip media bus (SLIMbus) may be presented. The apparatus may include means for providing a clock signal in an active mode, via a clock line, to a component communicatively coupled with the SLIMbus. The SLIMbus may comprise the clock line and a data line. Immediately prior to the clock signal in the active mode being provided, the clock signal may be in a paused mode. While the clock signal was in the paused mode, at least until the clock signal is provided in the active mode, the data line may be inactive. The apparatus may include means for transmitting inaccurate frame synchronization data for a first frame transmitted once the clock signal is provided in the active mode, wherein the inaccurate frame synchronization data for the first frame, as received by the component, does not match expected frame synchronization data. The apparatus may include means for transmitting payload data as part of the first frame to the component, wherein the payload data is expected to be successfully read by the component.

Such an apparatus may include one or more of the following: The apparatus may include means for reading the inaccurate frame synchronization data for the first frame from the data line, wherein the inaccurate frame synchronization data does not match the expected frame synchronization data. The apparatus may include means for processing the payload data of the first frame. A first bit of the inaccurate frame synchronization data, as read by the component, may be unexpected as compared with a first bit of the expected frame synchronization data. The means for transmitting the inaccurate frame synchronization data for the first frame may include means for transmitting a second bit, a third bit, and a fourth bit of the expected frame synchronization data. A synchronization tolerance of SLIMbus may permit incorrect frame synchronization data to be received by the component and the payload data of the frame to be processed. The apparatus may include means for storing data to be transmitted using the SLIMbus. The apparatus may include means for determining data to be transmitted to the component is stored by the means for storing data, wherein providing the clock signal in the active mode, via the clock line, to the component communicatively coupled with the SLIMbus is triggered by the means for determining data is present within the means for storing data.

An example of a non-transitory computer-readable medium comprising instructions may be presented. The instructions may be configured to cause the processor to provide a clock signal in an active mode, via a clock line, to a component communicatively coupled with a serial low-power inter-chip media bus (SLIMbus). The SLIMbus may comprise the clock line and a data line Immediately prior to the clock signal in the active mode being provided, the clock signal may be in a paused mode. While the clock signal was in the paused mode, at least until the clock signal is provided in the active mode, the data line may be inactive. The instructions may be configured to cause the processor to transmit inaccurate frame synchronization data for a first frame transmitted once the clock signal is provided in the active mode, wherein the inaccurate frame synchronization data for the first frame, as received by the component, does not match expected frame synchronization data. The instructions may be configured to cause the processor to transmit payload data as part of the first frame to the component, wherein the payload data is expected to be successfully read by the component.

Embodiments of such a non-transitory computer-readable medium may include one or more of the following: The instructions configured to cause the processor to transmit the inaccurate frame synchronization data for the first frame may comprise instructions configured to cause the processor to transmit only a second bit, a third bit, and a fourth bit of the expected frame synchronization data. A synchronization tolerance of SLIMbus may permit incorrect frame synchronization data to be received by the component and the payload data of the frame to be processed. The clock signal in the active mode may be provided by a framer of the processor. The instructions may be configured to cause the processor to determine data to be transmitted to the component is present within a message buffer of the processor, wherein providing the clock signal in the active mode, via the clock line, to the component communicatively coupled with the SLIMbus occurs at least partially due to determining data is present within the message buffer.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an embodiment of waveforms showing logical values of the clock line and data line of a data bus when a device connected with the data bus is signaling to the framer to restart the clock.

FIG. 4 illustrates an embodiment of waveforms showing logical values of the clock line and data line of a data bus when a framer connected with the data bus enters active clock mode without a toggle being applied to the data line.

DETAILED DESCRIPTION OF THE INVENTION

Figure 1:
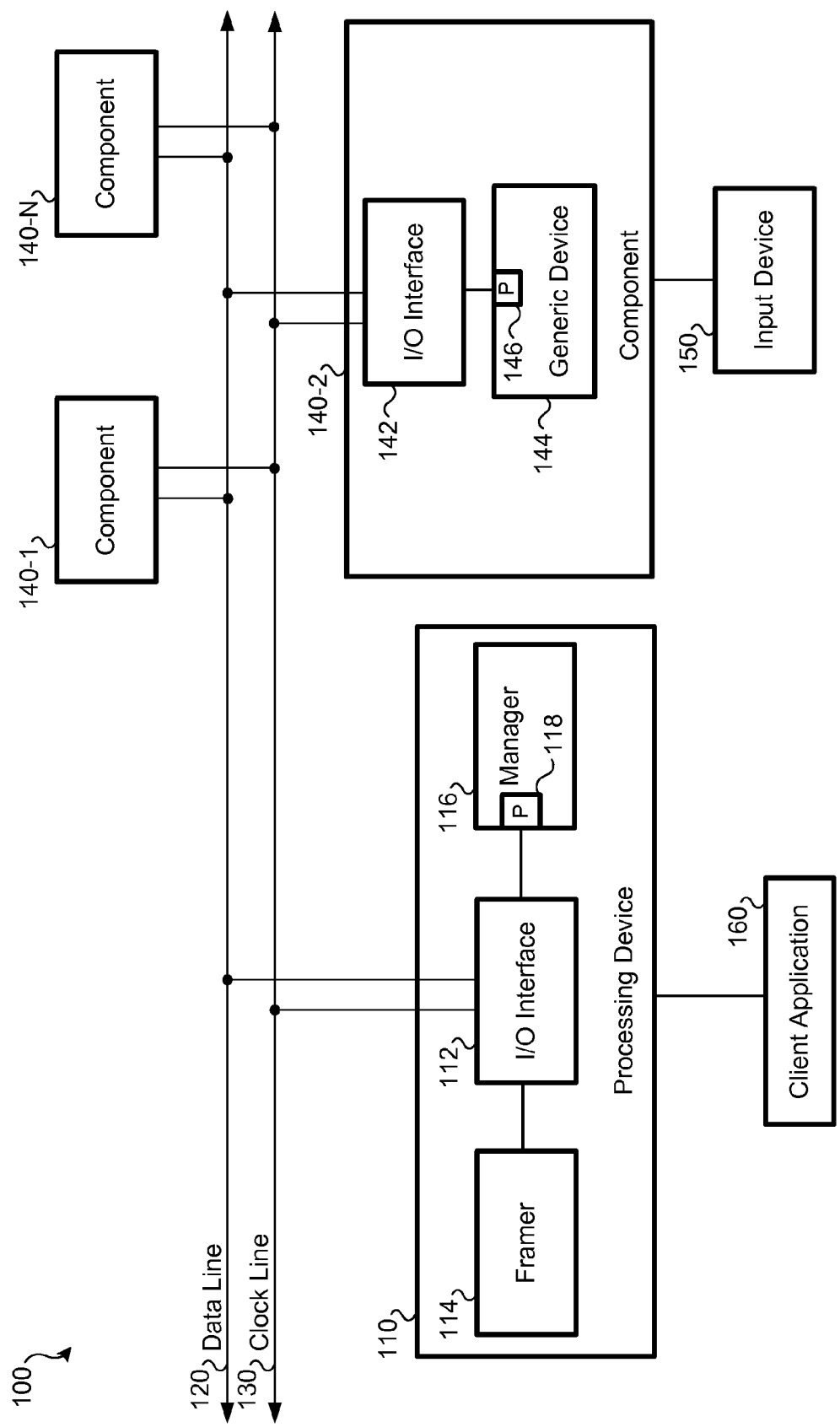
FIG. 1 illustrates a simplified block diagram of an embodiment of a system using a serial data bus.

Some systems that communicate using a serial data bus, such as a Serial Low-power Inter-chip Media Bus (SLIMbus), may have multiple clock modes. Such serial data buses may have a data line and a clock line. A first clock mode may be a paused clock mode. In the paused clock mode, the clock line of the serial data bus may be held in a steady state. In this clock mode, no frames of data may be transmitted via the data line. A second clock mode may be an active clock mode. In an active clock mode, a clock signal may be present on the clock line. In this active clock mode, the data line may be used, at least sporadically, to transmit frames of data among components connected with the serial data bus.

Since multiple clock modes are present, the serial data bus may occasionally transition between the modes. One such transition may be from the paused clock mode to the active clock mode. This passive-to-active transition may occur when a component connected with the serial data bus has provided an indication that the component has one or more frames of data to be transmitted using the serial data bus. The indication may be provided to another component that controls whether the serial data bus is in the passive clock mode or the active clock mode (which may be referred to as the framer). In order to provide the indication to the framer, the component that needs to transmit a frame of data via the serial data bus may toggle the data line of the serial data bus. This toggle may serve to trigger the framer to enter the active clock mode.

Once the active clock mode has been entered, the framer may drive an active clock signal on the clock line of the serial bus. The component that initiated the passive-to-active transition may then transmit a frame of data using the serial data bus. The frame of data may contain frame synchronization (sync) data and payload data. The payload data may contain substantive information being sent to another component connected with the serial data bus. The frame sync data may be a predefined sequence of bits that is used to synchronize components connected with the serial data bus. For example, the frame synchronization data may be the first four bits of the frame. The frame sync data expected to be read by components connected with the serial data bus may be "1011" (referred to as expected frame synchronization data). The first bit (1) of the frame sync data may be provided on the data line by the toggle provided by the component that triggered the framer to perform the passive-to-active transition of clock modes. As such, the toggle provided by the component serves as the first bit of the frame sync data.

Such an arrangement may be effective when a toggle is provided on the data line by a component that needs to transmit a frame of data via the serial data bus; however, in some instances, a frame of data may need to be transmitted via the serial data bus without a toggle being provided on the data line. For example, since the toggle provided on the data line may serve to alert the framer to perform the passive-to-active clock mode transition, if the framer determines to transmit a frame of data via the serial data bus without being requested by another component (e.g., the framer has a frame of data that needs to be transmitted to another component), the framer may not need to toggle the data line of the serial data bus (because no other component needs to be notified to change from the passive clock mode to the active clock mode). Rather, the framer can transition the serial data bus into the active clock mode itself and transmit one or more frames of data to one or more other components connected with the serial data bus. By not incorporating hardware to produce a toggle on the data line, the framer's design may be simplified.

Since the framer has not provided a toggle on the data line, the frame sync data of the first frame transmitted by the framer after transitioning from the passive clock mode to the active clock mode may be read by components connected with the serial data bus differently than if a toggle had been placed on the data line before the transition into the active clock mode. As such, while components may be expecting to read a first set of frame sync data (e.g., "1011"), instead a bit may be read differently due to the lack of the initial toggle on the data line (e.g., the frame sync data may be read as "0011").

Despite the frame sync data containing an unexpected bit, the payload data of the frame can be properly read by one or more components connected with the serial data bus. A serial data bus such as a SLIMbus may permit one bit of frame sync data to be read incorrectly without the payload data of the frame being discarded. If an additional unexpected bit is read by a component within a certain number of frames, the frame (and possibly additional frames) may be discarded by the component. As such, in some embodiments, as long as only the single bit of unexpected frame sync data is read by components in the frame transmitted by the framer device, the payload data of the frame may still be read properly by components connected with the serial data bus. As such, a framer can initiate a transition from the passive clock mode to the active clock mode and transmit a frame of data that is expected to be read properly by one or more components on the serial data bus without needing to toggle the data line of the serial data bus prior to exiting the passive clock mode.

Throughout this document, serial data buses are discussed. The examples that follow focus on the user of a SLIMbus serial data bus. It should be understood that similar principles may be applied to other forms of serial data buses.

FIG. 1 illustrates a simplified block diagram of an embodiment of a system 100 that includes a serial data bus, such as a Serial Low-power Inter-chip Media bus (SLIMbus). Such a data bus may be used in a mobile device such that audio, data, bus, and/or device control may occur via a single bus. Such a data bus may allow for multiple audio and/or data channels to use the same data bus. Further, in some embodiments, different sample rates for different audio channels may be supported at the same time. System 100 includes processing device 110 (which includes I/O interface 112, framer 114, and manager 116), data line 120, clock line 130, and components 140.

Processing device 110 may be a central processing unit (CPU), a digital signal processor (DSP), a state machine, a microcontroller (MCU) or other controller, a state machine, a lookup table, etc. For purposes of power optimization or other factors, a system may utilize multiple processing devices 110. Processing device 110 may manage a data bus that comprises data line 120 and clock line 130. In some embodiments, the data bus is a SLIMbus. Processing device 110 may include I/O interface 112. I/O interface 112 may provide management services for the data bus, control a frame layer of the bus, monitor message protocols implemented using processing device 110, and/or manage resets of processing device 110. Processing device 110 may store and/or access various non-transitory processor-readable instructions. These instructions may be executed by the processor and may cause the processor to perform various functions. For example, various steps of methods described herein may be stored as instructions and performed by processing device 110.

Framer 114 of processing device 110 may serve as the source for the clock signal driven on clock line 130. As such, the clock signal provided by framer 114 may be provided to all devices and components 140 connected with clock line 130. Framer 114 may have the ability to enter multiple clock modes, such as an active clock mode and a paused clock mode. When in the active clock mode, framer 114 supplies an active clock signal to clock line 130. When in active clock mode, frames of data may be transmitted by processor 110 and/or components 140 via the data bus. In the paused clock mode, framer 114 may hold clock line 130 in a single steady state (such that the logical value of clock line 130 does not change). In paused clock mode, clock line 130 may be held to a logical value of one. While in paused clock mode, frames of data may not be transmitted using the data bus. Framer 114 may also transmit guide and framing channels, collectively referred to as "framing information," on data line 120 to other components 140 connected with the data bus. This framing information may be used to establish a time division multiplexed (TDM) frame structure of the bus and/or to communicate such information to other devices and components 140 connected with the bus for establishing synchronization.

Manager 116 may be responsible for booting the data bus and performing data bus administration. Bus administration may include enumeration of devices and components 140 connected with the bus, bus configuration, and/or dynamic channel allocation. The manager also may include a port 118, or logical address, on the bus to help enable the manager to perform the data bus administration. If multiple managers are connected with the data bus, only one manager may be permitted to be active at a given time. While I/O interface 112, framer 114, and manager 116 are illustrated as part of (or as being executed by) processing device 110, in some embodiments some or all of these components may be separate components that are individually connected with the data bus. For example, while in system 100, manager 116 is present in the same processor 110 as framer 114; in some embodiments, manager 116 and framer 114 may be in separate physical components connected with the data bus.

FIG. 1 illustrates three components, 140-1, 140-2, and 140-N, connected with data line 120 and clock line 130. Here, "component" is a general term for a device that is connected with the data bus. Components typically provide various application functionality, such as analog-to-digital conversion (ADC) or digital-to-analog conversion (DAC). As an example, a component, such as component 140-1, may be a processor, such as a CPU or DSP, that is connected with a microphone. When information is received by the generic processor from the microphone, it may be digitized, analyzed, and, if the data is to be transmitted to one or more other devices and/or components 140 connected with the data bus, transmitted using the data bus. While the illustrated embodiment of system 100 illustrates three components 140, it should be understood that greater or fewer components may be connected with the data bus.

For simplicity, additional detail has been shown in only component 140-2. A component of components 140 may contain various sub-components, such as an I/O interface 142 and generic device 144. Such sub-components may permit component 140-2 to communicate via the data bus and receive and analyze data from some other device, respectively. For example generic device 144 may allow data to be exchanged (e.g., transmitted and/or received) with a device such as input device 150. The generic device may include a port 146, or logical address on the data bus, to help enable the data exchange. Similar details may be present in components 140-1 and 140-N.

Components 140 and processing device 110 may be associated with one or more "ports" 118, 146 that are merged onto the bus. Various numbers (e.g., 32, 64, etc.) of ports can be utilized on each device, which may be dictated by the standards of the data bus. Ports are logical addresses of the bus (having corresponding physical connections to the data bus), utilized for access to a data channel associated with the data bus. Put another way, a port is a logical end to a data channel, and a data channel can be set up between two ports that can be dynamically and logically connected with the data channel.

The ports provide a mechanism by which communication can be coordinated on a data bus via TDM. For example, different TDM time slots can be allocated for various ports at various times. Such time slots can be uniform or non-uniform. Further, depending on whether a given port is a source or destination at a given time, the time slots provide for either sourcing or sampling of data from the corresponding data bus. Finally, as discussed in further detail below, some devices may be connected with the data bus, but have no corresponding logical address, and therefore no port. Such non-ported devices can be configured to communicate on message channels of the data bus.

While I/O interfaces 112 and 142 are shown in FIG. 1 as associated with ported devices, I/O interfaces 112 and 142 may associate with any number of generic devices, non-ported generic devices or ports, including zero devices and/or ports. In the event that an I/O interface 112 or 142 is associated with no devices or ports, a framer 114 associated with the data bus may nonetheless continue to provide a clock signal to the bus components.

A data bus as illustrated in FIG. 1, such as a SLIMbus, may operate using a multi-drop bus topology where bus signals are common to all components on the bus. To prevent interference between components on the bus, the data bus is configured such that only one transmitter device communicates on the bus at any given time. This constraint may be enforced through an arbitration procedure and/or other collision avoidance mechanisms.

While the above description provides a basic primer on how devices and components 140 on a data bus (such as a SLIMbus) may communicate, it should be understood that additional components may be present that are not illustrated for simplicity.

For example, the processor 110 and a component 140 may have one or more message buffers to buffer data that is to be transmitted using the data bus and/or to buffer data that is being received via the data bus. Additional information may be found in the specification for the specific form of data bus being used. For example, Version 1.01 of the SLIMbus specification, published by the Mobile Industry Processor Interface (MIPI) Alliance, provides additional information regarding the implementation of SLIMbus systems.

The data bus of system 100 uses a synchronous, two-wire bus to distribute data between components connected with the clock line and data line. As discussed above, the data bus can utilize a TDM scheme to allow multiple receiving and transmitting devices to utilize and communicate through the data bus. Here, the organization of data as distributed in time using the data bus is referred to as the "frame structure." The frame structure of the data bus, if a SLIMbus, may have five sub-parts: cells, slots, frames, subframes, and superframes. A "cell" refers to the smallest subdivision of data transported using the data bus. A cell is bounded by two consecutive clock positive boundaries and holds a single bit of information. A "slot" refers to four contiguous cells. A slot, therefore, contains four bits of information. The bits are from most significant bit to least significant bit (e.g., the most significant bit is on the left). A "frame" is defined as 192 contiguous slots. The first slot of a frame is a control space slot that contains a four bit frame synchronization symbol (also referred to as frame sync data). This frame sync symbol is represented by the binary sequence "1011." Similarly, slot 96 of each frame may also be a control space slot that contains four bits of framing information. The frame sync data and thirty-two bits of framing information are used to synchronize the bus. To receive all thirty-two bits of framing information, data may be read from slot 96 of eight successive frames. These eight successive frames are referred to as a "superframe." As such, eight contiguous frames comprise a single superframe.

If synchronization is lost by a component connected with the data bus, an entire superframe may not be able to be read by the device. Referring to a SLIMbus, an amount of tolerance has been designed in such that, if a single frame-sync slot is not as expected, the data of the superframe may still be read properly. However, if a second consecutive frame sync slot is in error, then data in the superframe shall not be read by the device. As such, multiple errors in a single frame-sync slot can be tolerated as long as there are no errors in the following frame sync slot.

A "subframe" is defined as a division of the frame structure at which control space and data space are interleaved. Regardless, the first slot is allocated to control space. Subframes may not have a single, fixed length. Rather, subframe length may be varied among various, predefined lengths. Referring to a SLIMbus, the length may be programmable to 6, 8, 24, or 32 contiguous slots (e.g., 24, 32, 96, or 128 cells). In the SLIMbus, the subframe configuration may be dynamically varied based on factors such as the data flow requirements of applications being supported by the SLIMbus at the time.

With this topology, a client application 160 can gain access to any component 140 on the data bus through the processing device 110. The client application 160 can include any of a variety of functions, such as music playback, audio recording, data transfer, and/or more, that might require access to one or more components 140 connected with the bus. For example, if client application 160 is an audio recording application and input device 150 is a microphone, client application 160 can access input device 150 by communicating the need to access input device 150 to processing device 110. Processing device 110, using manager 116, arranges for a data channel to be set up on the data bus for access to input device 150 and communicates the request to component 140-2 in accordance with the specifications of the data bus. After receiving the request from processing device 110, component 140-2 can receive an analog audio input from the input device 150 and convert it to a digital format using generic device 144, which may be an ADC. Once in a digital format, component 140-2 can communicate the data from the input device through the data bus back to processing device 110 using I/O interface 142. Finally, processing device 110 can provide the data to client application 160. Thus, client application 160 gains access to bus components 140 via processing device 110 and the data bus.

Figure 2:
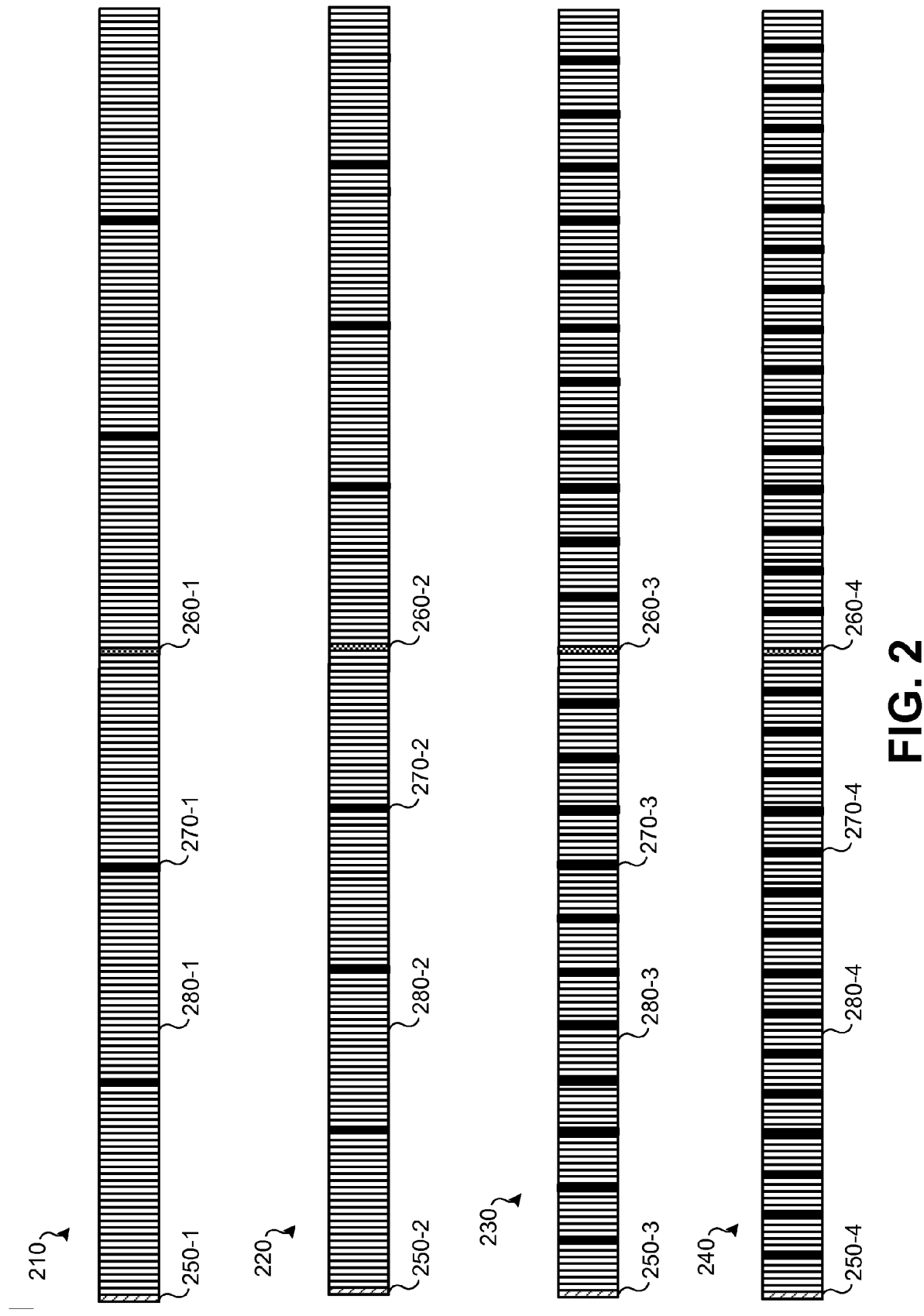
FIG. 2 illustrates a graphical representation of various frames having frame sync data, control data, and framing information.

FIG. 2 illustrates a graphical representation of various frames having frame sync data, control data, and framing information. Such frame configurations may be used on a SLIMbus. Arrangement 210 refers to a frame that has subframes of 32 slots. Arrangement 220 refers to a frame that has subframes of 24 slots. Arrangement 230 refers to a frame that has subframes of 8 slots. Next, arrangement 240 refers to a frame that has subframes of 6 slots. Frame sync data 250 (represented by striped slots, such as frame sync data 250-1) is present as the first slot in each frame. Framing information 260 (represented by dotted slots, such as framing information 260-1) is present at slot 96 in each arrangement. Control data 270 (represented by black slots, such as control data 270-1) is interspersed with slots of payload data 280 (represented by white slots, such as payload data 280-1) according to the subframe arrangement.

As discussed above, a framer, such as framer 114 of FIG. 1, generates the clock signal that is distributed to devices connected with clock line 130 of the data bus. The framer can function in at least two clock modes: an active clock mode and a paused clock mode. In active clock mode, a clock signal is distributed via a clock line to devices connected with the data bus. When the framer is in active clock mode, data may be transmitted via data line 120 of the data bus. In paused clock mode, the framer may hold the clock line in a steady state, such as logically high. In such a state, data may not be transmitted among devices via the data bus. As such, while in paused clock mode, the data line may also remain in a steady logical state, with an exception described below.

Paused clock mode may be entered by framer 114 when no data needs to be transported using the data bus. At some point, a device attached with the data bus, such as component 140-2 of FIG. 1, may have data that is to be transmitted via the data bus to one or more components connected with the data bus. In order to signal to the framer to restart the clock signal (change clock modes from paused clock mode to active clock mode), component 140-2 may toggle the data line while the data bus is in the paused clock mode. As such, if the data line is logically low, the device that has data to be transmitted using the data bus may drive the data line to a logical high. This toggle of the data line serves to signal to the framer to transition the data bus to the active clock mode from the passive clock mode.

The above situation is depicted in FIG. 3. FIG. 3 illustrates an embodiment of waveforms 300 showing logical values of the clock line and data line of a data bus, such as a SLIMbus, when a device connected with the data bus is signaling to the framer to restart the clock. Waveforms 300 may be present on the data bus of system 100 or of some other system that uses a serial data bus. During time period 310, the framer is in active clock mode. As such, the clock line has an active clock signal distributed on it. At the end of time period 310, the framer has determined to enter the paused clock mode. As such, for time period 320, the clock line is maintained in a steady state by the framer. During clock paused mode, toggle 340 of the data line is performed by a component connected with the data bus that has data to be transmitted using the data bus. For example, referring to system 100, component 140-2 may have data to be transmitted to another component, such as component 140-1, via the data bus. Upon sensing toggle 340, the framer enters active clock mode for time period 330. In response to sensing the toggle, the framer may begin driving the clock line with a clock signal. As such, the device that created toggle 340 may now be able to transmit one or more frames of data.

Data transmitted via the data bus, such as a SLIMbus, may be transmitted via a non-return to zero, inverted (NRZI) data transmission scheme. In such a data transmission scheme, a logical one is represented by a logical change (zero to one or one to zero) on the data line during a time period, and a logical zero is represented by a steady state being maintained on the data line during the time period. As such, the toggle of the data line (which is created by the component that desires exit of the paused clock mode and the active clock mode to be entered by the framer such that the component can transmit data) is read by devices attached with the data bus as a logical one. This may conform to the frame structure of the SLIMbus: for example, referring to SLIMbus, each frame begins with a frame sync data in the first slot. The bits of the frame sync slot are "1011." Therefore, the toggle, according to the SLIMbus protocol, serves as the first "1" of the frame sync slot.

If the framer determines to enter active clock mode without detecting a toggle on the data line (e.g., the component containing the framer has data to be transmitted via the data bus), the data line may not be toggled while in paused clock mode. Rather, the framer may restart the clock without the data line being toggled. By restarting the clock line without the data line being toggled, the first bit of the first slot of the first frame (that is, the first cell (bit) of the frame sync data of the first frame) may be read as a zero. As such, devices connected with the data bus, rather than reading the expected frame sync information ("1011"), may read "0011." As such, the first bit of the frame sync information may not be as expected.

If synchronization is lost (e.g., the frame sync data of more than one frame is not as expected) by a device attached with the data bus, an entire superframe may be lost (e.g., not be read) by that device before the device can reestablish synchronization. Although the frame sync data of the initial frame may not be as expected, synchronization can be established such that the initial frame transmitted by the framer upon the framer entering active clock mode following the paused clock mode (when another device has not provided a toggle on the data line) is read properly by one or more components connected with the data bus.

The specification of the data bus, such as if it is a SLIMbus, may be exploited such that initial frames are not lost when the framer determines to switch from paused clock mode to active clock mode without a toggle being driven on the data line (by the framer or a component) while in the paused clock mode. Referring to a SLIMbus, a tolerance of one erroneous frame sync slot is permissible without the data contained in the superframe being discarded (as unreadable by the device performing the read). Therefore, as long as the frame sync data in the following frame is read correctly, the error in the first frame sync slot does not prevent the initial frame (and the remainder of the initial superframe) from being read by components connected with the data bus. As such, the framer can switch from paused clock mode to active clock mode without a toggle being placed on the data line (during the paused clock mode) and expect that payload data contained in the first frame (and the first superframe) will be read properly by the appropriate components connected with the data bus.

The above situation is depicted in FIG. 4. FIG. 4 illustrates an embodiment of waveforms 400 showing logical values of the clock line and data line of a data bus, such as a SLIMbus, when a framer connected with the data bus enters active clock mode without a toggle being applied to the data line while in a paused mode. Waveforms 400 may be waveforms present on the data bus of system 100 or some other system that uses a serial data bus. During time period 410, the framer is in active clock mode. As such, the clock line is driven by the framer with a clock signal. At the end of time period 410, the framer has entered paused clock mode. As such, for time period 420, the clock line is maintained in a steady state (in this instance, maintained in a high steady state).

The framer may determine that the active clock mode should be entered (for a reason, such as, the component that includes the framer has one or more frames of data that are to be transmitted to a component via the data bus). The framer enters active clock mode for time period 430. Data 440 may be read as "0011" by devices connected with the data bus. Data 440 may be the frame sync data of a first frame transmitted by the component having the framer. This first slot serves as the frame sync data. Data 440 may vary from the expected frame sync information of "1011" by one bit. However, because this erroneous frame sync slot is not the second of two consecutively erroneous frame sync slots, the frame (and remainder of the superframe) may be read by components reading frames from the data line of the data bus. The remainder of the frame and superframe may be read correctly by components connected with the data bus.

Figure 5:
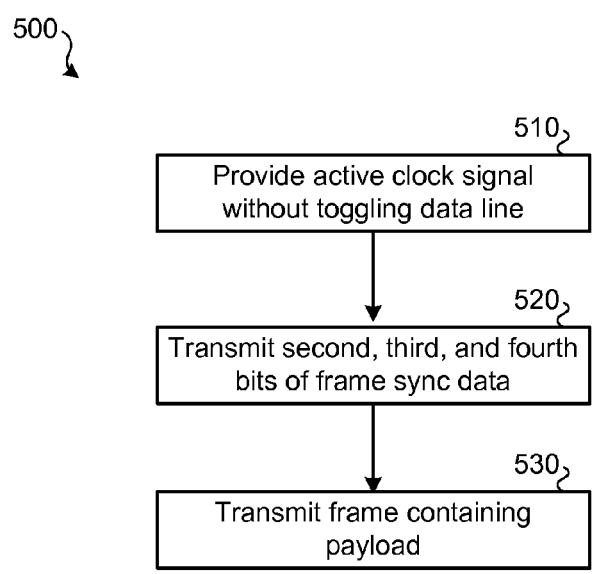
FIG. 5 illustrates an embodiment of a method for transmitting data using a data bus following a transition from a paused clock mode to an active clock mode.

FIG. 5 illustrates an embodiment of a method 500 for transmitting data using a data bus following a transition from a paused clock mode to an active clock mode. Method 500 may be performed by a system that utilizes a serial data bus, such as a SLIMbus, for data transmission. Method 500 may be performed by a system such as system 100 of FIG. 1. Other embodiments of systems may also perform method 500.

At step 510, a framer, such as framer 114 of FIG. 1, may enter an active clock mode and consequently provide an active clock signal to a clock line of a serial data bus, such as a SLIMbus. The framer may have entered the active clock mode because the component that contains the framer has data to be transmitted using the data bus. As such, no toggle may have been driven on the data line of the data bus while the framer was in paused clock mode. More specifically, the framer has determined to transition from the paused clock mode to the active clock mode without detecting a toggle from another component on the data line and the framer has not driven the data line with a toggle. As such, no toggle is present on the data line during the paused clock mode. Step 510 may be performed, for example, by a processor, a framer (which may be part of a processor), or other such means for providing an active clock signal.

At step 520, frame sync data may be transmitted by the framer. This frame sync data may be a four bit slot that is the first slot of the first frame transmitted by the component having the framer. The frame sync information that is expected by components connected with a SLIMbus may be "1011" and may be used for data bus synchronization by the components connected with the data bus. Since no toggle has been transmitted during the paused clock mode (wherein the toggle would serve as the first bit of the frame sync data), the first bit of the frame sync information is treated as a "0" (corresponding to the lack of toggle in the NRZI protocol). The second bit, third bit, and fourth bit of the frame sync bits are transmitted by the framer as normal (without error). The first bit is not transmitted by the framer. Step 520 may be performed, for example, by a processor, a framer (which may be part of a processor), or other such means for transmitting frame sync data.

At step 530, the component containing the framer may transmit the remainder of the first frame, including payload data. This data may be expected to be read properly (assuming no other frame sync data errors occur) by one or more other components connected with the serial data bus despite the frame sync data being incorrect because of the SLIMbus's tolerance for an error in a frame's synchronization data. Step 530 may be performed, for example, by a processor, a framer (which may be part of a processor), or other such means for transmitting a frame.

Figure 6:
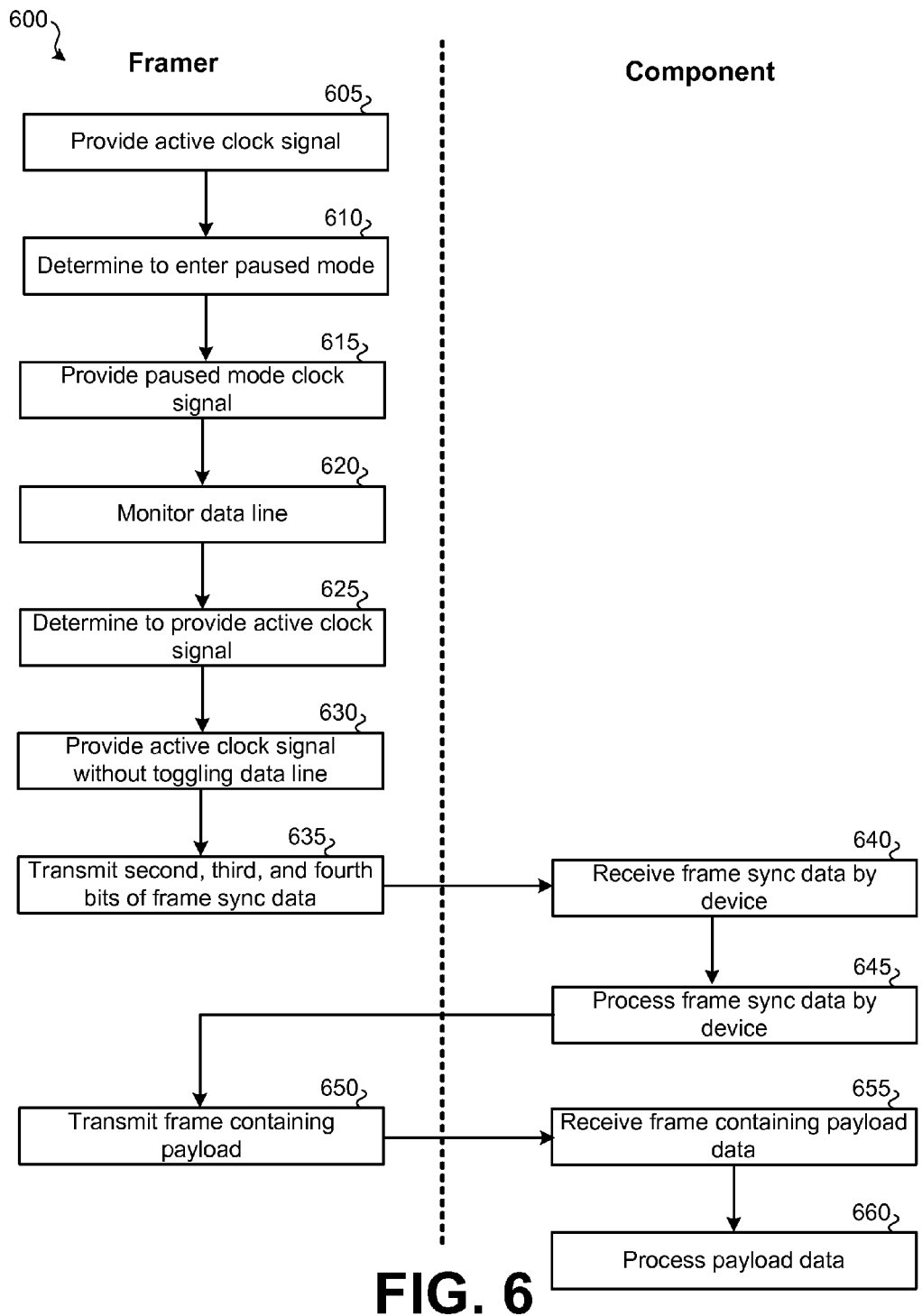
FIG. 6 illustrates another embodiment of a method for restarting data transmission on a data bus following a clock transitioning from a paused clock mode to an active clock mode.

FIG. 6 illustrates an embodiment of a method 600 for restarting data transmission on a data bus following a clock transitioning from a paused clock mode to an active clock mode. In method 600, the data bus may be a SLIMbus that uses NRZI for a data transmission scheme. Further, the clock signal may be transitioned from the paused clock mode to the active clock mode by a framer. Method 600 may be performed by a system such as system 100 of FIG. 1. Other embodiments of systems may also perform method 600.

At step 605, a framer, such as framer 114 of FIG. 1, may provide an active clock signal. While the active clock signal is being provided by the framer, the framer or some other device connected with the data bus may be transmitting data. At step 610, the framer may determine to enter the paused clock mode. Paused clock mode may be entered because data has not been transmitted on the data bus for a predetermined period of time. Other predetermined conditions may also be used to determine whether the framer should have the data bus enter the paused clock mode. At step 615, the framer may drive a clock line of the bus, such as clock line 130 of FIG. 1, with a steady state signal. As such, in the paused clock mode, the framer may hold the clock in a particular logical state, such as high.

At step 620, the framer may monitor the data line, such as data line 120 of FIG. 1. If a toggle is detected on the data line, this may indicate to the framer that some component (other than the framer) on the data bus needs to transmit data using the data bus, and the framer may therefore enter the active clock mode. For the remainder of the described embodiment of method 600, it is assumed that a toggle is not sensed by the framer on the data line; rather, the component that includes the framer determines it has data that needs to be transmitted using the data bus. As such, based on the presence of data that the framer needs to transmit via the data bus (or some other condition), the framer determines to enter the active clock mode at step 625. The active clock signal may be provided by the framer to the clock line of the data bus at step 630. Neither the framer (nor any other component) has toggled the data line when the active clock signal is provided at step 630 by the framer.

At step 635, the frame sync data may be transmitted by the framer. This frame sync data may be a four bit slot that is the first slot of the first frame transmitted. The frame sync information may be expected to be "1011" by components and may be used for data bus synchronization by such other components connected with the data bus. Since no toggle has been transmitted during the paused clock mode (wherein the toggle would serve as the first bit of the frame sync data) by the framer, the framer is past the opportunity to transmit the first bit of the frame sync data; hence, only the second, third, and fourth bits of the frame sync symbol are transmitted by the framer. Steps 605-635 may be performed, for example, by a processor, a framer (which may be part of a processor), or other such means.

At step 640, the frame sync data may be received by one or more components connected with the data bus. It should be understood that the frame sync data may be received by the one or more devices before the remainder of the frame is transmitted by the framer at step 640. At step 645, the frame sync data may be processed by the one or more devices connected with the data bus. Because an initial toggle was not present on the data bus and the data bus uses NRZI as a transmission scheme, the first bit of the data read by the devices may be zero. As such, rather than the frame sync information being read by the devices as expected ("1011"), the frame sync information may be read as "0011." Due to the specifications of the data bus (e.g., SLIMbus), tolerance permitted by the serial bus components receiving the frame containing the frame sync data may allow the data contained in the frame (and the remainder of the superframe) to be read and processed by the one or more components connected with the data bus. Steps 640 and 645 may be performed, for example, by a component, or other such means.

At step 650, the framer may transmit the remainder of the first frame, including (payload) data. Step 650 may be performed, for example, by a processor, a framer (which may be part of a processor), or other such means for transmitting a frame. At step 655, the first frame and one or more subsequent frames (including the payload data of each frame) may be received and processed properly by the components connected to the data bus (notwithstanding the incorrect frame sync data of the first frame transmitted by the framer). At step 660, the one or more devices that have received the frames at step 655 may process the frames and corresponding payload data as appropriate. It should be understood that the frame sync data transmitted at step 635 and the payload data transmitted at step 650 may occur before the frame sync data and the payload data are processed by the receiving component. Steps 655 and 660 may be performed, for example, by a component, or other such means.

Figure 7:
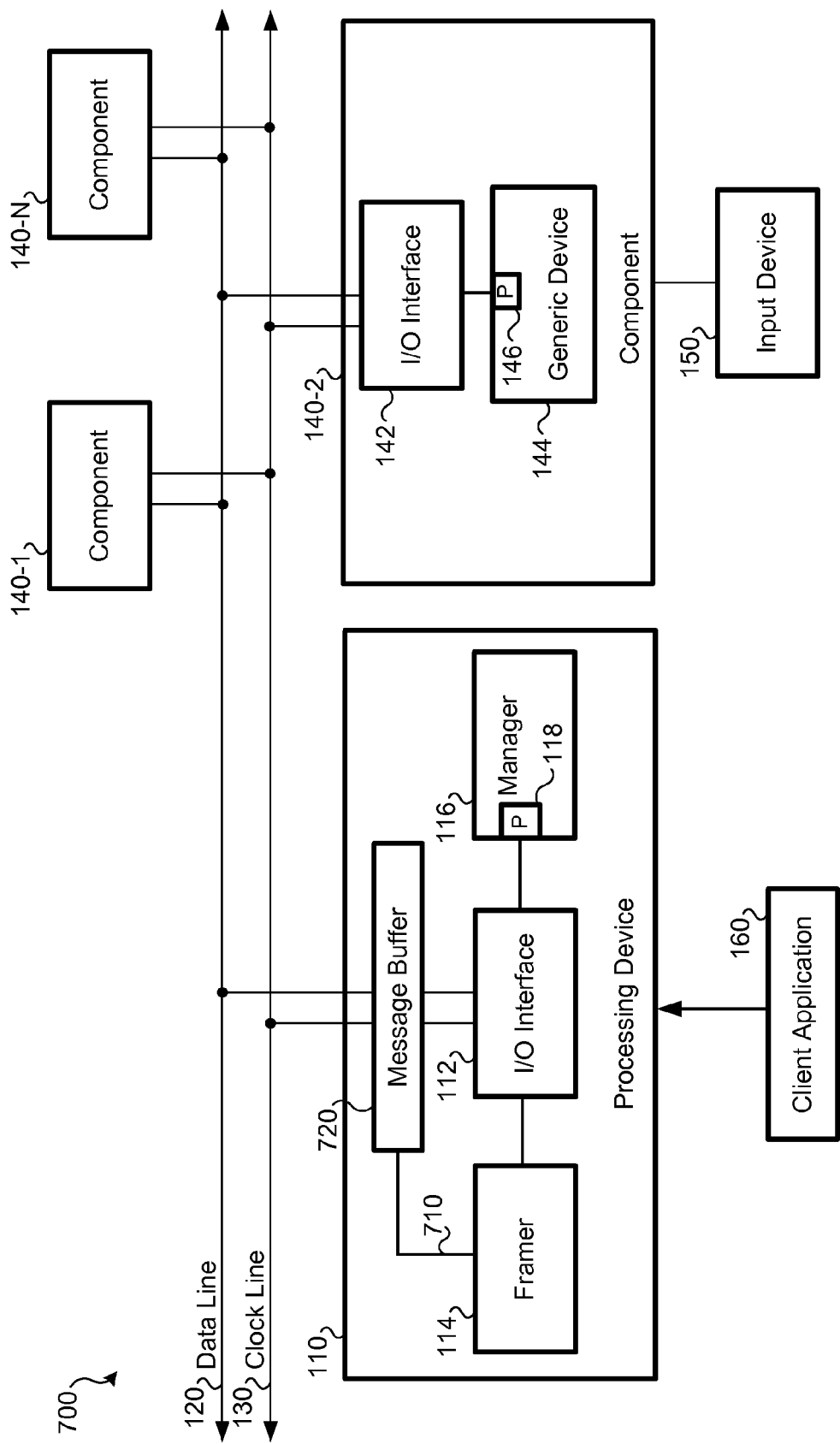
FIG. 7 illustrates a simplified block diagram of an embodiment of a system using a serial data bus having a message buffer in communication with the framer.

As previously discussed, method 600 may be performed if a framer has made the determination to enter the active clock mode from the paused clock mode without a toggle being sensed on the data line of the data bus. If another device, such as a component, determines that the active clock mode should be entered from the paused clock mode, the component may produce a toggle on the data line to trigger the framer to restart the clock signal. Without such a toggle being sensed on the data line, in order for the framer to determine when the data bus should enter active clock mode, the framer may receive a trigger from some other source. The trigger may be a signal from a message buffer (which may be part of the same component that contains the framer) that indicates that at least a frame of data needs to be transmitted to at least one other component connected with the data bus. FIG. 7 illustrates a simplified block diagram of an embodiment of a system 700 using a serial data bus, such as a Serial Low-power Inter-chip Media bus (SLIMbus), having a framer that is triggered by a message buffer. System 700 may represent an embodiment of system 100 of FIG. 1. System 700 may also represent some other data bus system.

Processing device 110 is illustrated as having message buffer 720. Message buffer 720 may receive and store messages from processing device 110 that is to be transmitted via the data bus that includes data line 120 and clock line 130. A message may remain in message buffer 720 until the message has been transmitted on the data bus. When a message is received by message buffer 720 and the framer is not driving the clock line in the active clock mode, this may serve as an indication to message buffer 720 that the framer is to be alerted to enter active mode from paused clock mode. To alert framer 114, message buffer 720 may provide a signal (such as a toggle) to framer 114. This may occur via an internal wakeup line 710 (or some other communication path) within processing device 110. Upon sensing the signal on wakeup line 710, the framer may exit paused clock mode and enter active clock mode. No toggle may be applied by component 140-2, framer 114, processing device 110, or any other device to data line 120 until active clock mode has been entered. As such, when the framer senses a signal on wakeup line 710, method 700 may be performed as previously described.

In some embodiments, the functions of framer 114, message buffer 720, I/O interface 112 and/or manager 116 may be implemented using firmware and/or software. In such embodiments, the framer may be triggered to enter the active clock mode when message buffer 720 writes to a particular memory address or otherwise notifies framer 114 to enter active clock mode.

Figure 8:
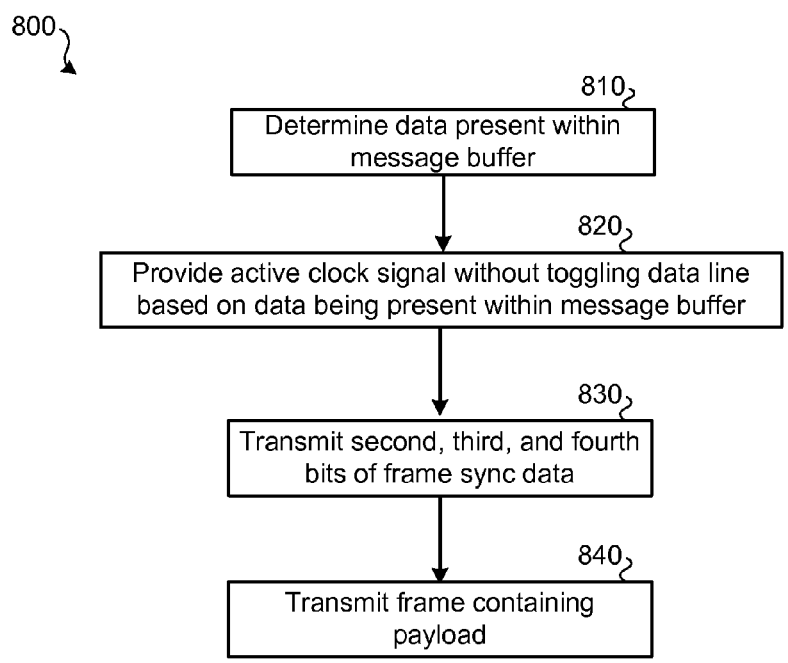
FIG. 8 illustrates an embodiment of a method for restarting data transmission on a data bus following a clock transitioning from a paused clock mode to an active clock mode based on data being present in a message buffer in communication with the framer.

FIG. 8 illustrates an embodiment of a method for restarting data transmission on a data bus following a clock transitioning from a paused clock mode to an active clock mode based on data being present in a message buffer in communication with the framer. In method 800, the data bus may be a SLIMbus that uses NRZI for a data transmission scheme. Further, the clock signal may be transitioned from the paused clock mode to the active clock mode by a framer. Method 800 may be performed by a system such as system 700 of FIG. 7. Other embodiments of systems may also perform method 800.

At step 810, a determination may be made that data to be transmitted (e.g., a frame of data) is present within the message buffer. Referring to system 700, framer 114 may determine that data is present within message buffer 720 via wakeup line 710. Step 810 may be performed, for example, by a processor, a framer (which may be part of a processor), or other such means for determining data is present within a message buffer.

At step 820, a framer, such as framer 114 of FIG. 1, may enter an active clock mode and consequently provide an active clock signal to a clock line of a serial data bus, such as a SLIMbus, in response to step 810. The framer may have entered the active clock mode because the component that contains the framer has data to be transmitted using the data bus. As such, no toggle may have been driven on the data line of the data bus while the framer was in paused clock mode. More specifically, the framer has determined to transition from the paused clock mode to the active clock mode without detecting a toggle from another component on the data line and the framer has not driven the data line with a toggle. As such, no toggle is present on the data line during the paused clock mode. Step 820 may be performed, for example, by a processor, a framer (which may be part of a processor), or other such means for providing an active clock signal.

At step 830, frame sync data may be transmitted by the framer. This frame sync data may be a four bit slot that is the first slot of the first frame transmitted by the component having the framer. The frame sync information that is expected by components connected with a SLIMbus may be "1011" and may be used for data bus synchronization by the components connected with the data bus. Since no toggle has been transmitted during the paused clock mode (wherein the toggle would serve as the first bit of the frame sync data), the framer is past the opportunity to transmit the first bit of the frame sync data; hence, only the second, third, and fourth bits of the frame sync symbol are transmitted by the framer. The first bit is not transmitted by the framer. Step 830 may be performed, for example, by a processor, a framer (which may be part of a processor), or other such means for transmitting frame sync data.

At step 840, the component containing the framer may transmit the remainder of the first frame, including payload data. This data may be expected to be read properly (assuming no other frame sync data errors occur) by one or more other components connected with the serial data bus despite the frame sync data being incorrect because of the SLIMbus's tolerance for an error in a frame's synchronization data. Step 840 may be performed, for example, by a processor, a framer (which may be part of a processor), or other such means for transmitting a frame.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example embodiments (including implementations). However, embodiments may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for restarting data transmission on a serial low-power inter-chip media bus (SLIMbus), the method comprising:
    providing a clock signal in an active mode, via a clock line, to a component communicatively coupled with the SLIMbus, wherein:
        the SLIMbus comprises the clock line and a data line;
        immediately prior to the clock signal in the active mode being provided, the clock signal was in a paused mode; and
        while the clock signal was in the paused mode, at least until the clock signal is provided in the active mode, the data line has been inactive;
    transmitting from a transmitting component inaccurate frame synchronization data for a first frame transmitted once the clock signal is provided in the active mode, wherein the inaccurate frame synchronization data for the first frame, as received by the component, does not match expected frame synchronization data, wherein a difference between the inaccurate frame synchronization data and the expected frame synchronization data is caused by the transmitting component failing to transmit a toggle signal on the data line; and
    transmitting from the transmitting component payload data as part of the first frame to the component, wherein the payload data is expected to be successfully read by the component.

2. The method for restarting data transmission on the SLIMbus of claim 1, wherein a first bit of the inaccurate frame synchronization data is unexpected as compared with a first bit of the expected frame synchronization data.

3. The method for restarting data transmission on the SLIMbus of claim 2, wherein a second bit, a third bit, and a fourth bit of the inaccurate frame synchronization data are expected as compared with a second bit, a third bit, and a fourth bit of the expected frame synchronization data.

4. The method for restarting data transmission on the SLIMbus of claim 1, wherein a synchronization tolerance of the SLIMbus permits incorrect frame synchronization data to be received by the component and the payload data of the frame to be processed.

5. The method for restarting data transmission on the SLIMbus of claim 1, wherein the clock signal in the active mode is provided by a framer communicatively coupled with the SLIMbus.

6. The method for restarting data transmission on the SLIMbus of claim 1, further comprising:

determining data to be transmitted to the component is present within a message buffer, wherein providing the clock signal in the active mode, via the clock line, to the component communicatively coupled with the SLIMbus occurs at least partially due to determining data is present within the message buffer.

7. A system configured for restarting data transmission on a serial low-power inter-chip media bus (SLIMbus), the system comprising:
 a data line of the SLIMbus;
 a clock line of the SLIMbus;
 a component communicatively coupled with the data line and the clock line of the SLIMbus; and
 a framer communicatively coupled with the clock line and the data line of the SLIMbus, wherein the framer is configured to:
  provide a clock signal in an active mode, via the clock line, to the component communicatively coupled with the SLIMbus, wherein:
   immediately prior to the clock signal in the active mode being provided, the clock signal was in a paused mode; and
   while the clock signal was in the paused mode, at least until the clock signal is provided in the active mode, the data line has been inactive;
  transmit from a transmitting component inaccurate frame synchronization data for a first frame transmitted once the clock signal is provided in the active mode, wherein the inaccurate frame synchronization data for the first frame, as received by the component, does not match expected frame synchronization data, wherein a difference between the inaccurate frame synchronization data and the expected frame synchronization data is caused by the framer failing to transmit a toggle signal on the data line; and
  transmit from the transmitting component payload data as part of the first frame to the component, wherein the payload data is expected to be successfully read by the component.

8. The system configured for restarting data transmission on the SLIMbus of claim 7, wherein a first bit of the inaccurate frame synchronization data is unexpected as compared with a first bit of the expected frame synchronization data.

9. The system configured for restarting data transmission on the SLIMbus of claim 8, wherein the framer being configured to transmit the inaccurate frame synchronization data for the first frame comprises the framer being configured to transmit only a second bit, a third bit, and a fourth bit of the expected frame synchronization data.

10. The system configured for restarting data transmission on the SLIMbus of claim 7, wherein a synchronization tolerance of SLIMbus permits incorrect frame synchronization data to be received by the component and the payload data of the frame to be processed.

11. The system configured for restarting data transmission on the SLIMbus of claim 7, further comprising:
 a message buffer communicatively coupled with the framer, wherein the framer is further configured to determine when data to be transmitted to the component is present within the message buffer, wherein the framer being configured to provide the clock signal in the active mode occurs at least partially due to the framer determining data is present within the message buffer.

12. An apparatus for restarting data transmission on a serial low-power inter-chip media bus (SLIMbus), the apparatus comprising:
 means for providing a clock signal in an active mode, via a clock line, to a component communicatively coupled with the SLIMbus, wherein:
  the SLIMbus comprises the clock line and a data line;
  immediately prior to the clock signal in the active mode being provided, the clock signal was in a paused mode; and
  while the clock signal was in the paused mode, at least until the clock signal is provided in the active mode, the data line has been inactive;
 means for transmitting from a transmitting component inaccurate frame synchronization data for a first frame transmitted once the clock signal is provided in the active mode, wherein the inaccurate frame synchronization data for the first frame, as received by the component, does not match expected frame synchronization data, wherein a difference between the inaccurate frame synchronization data and the expected frame synchronization data is caused by the transmitting component failing to transmit a toggle signal on the data line; and
 means for transmitting from the transmitting component payload data as part of the first frame to the component, wherein the payload data is expected to be successfully read by the component.

13. The apparatus for restarting data transmission on the SLIMbus of claim 12, wherein a first bit of the inaccurate frame synchronization data is unexpected as compared with a first bit of the expected frame synchronization data.

14. The apparatus for restarting data transmission on the SLIMbus of claim 13, wherein a second bit, a third bit, and a fourth bit of the inaccurate frame synchronization data are expected as compared with a second bit, a third bit, and a fourth bit of the expected frame synchronization data.

15. The apparatus for restarting data transmission on the SLIMbus of claim 12, wherein a synchronization tolerance of SLIMbus permits incorrect frame synchronization data to be received by the component and the payload data of the frame to be processed.

16. The apparatus for restarting data transmission on the SLIMbus of claim 12, further comprising:
 means for storing data to be transmitted using the SLIMbus; and
 means for determining data to be transmitted to the component is stored by the means for storing data, wherein providing the clock signal in the active mode, via the clock line, to the component communicatively coupled with the SLIMbus is triggered by the means for determining data is present within the means for storing data.

17. A non-transitory computer-readable medium comprising instructions configured to cause a processor to:
 provide a clock signal in an active mode, via a clock line, to a component communicatively coupled with a serial low-power inter-chip media bus (SLIMbus), wherein:
  the SLIMbus comprises the clock line and a data line;
  immediately prior to the clock signal in the active mode being provided, the clock signal was in a paused mode; and
  while the clock signal was in the paused mode, at least until the clock signal is provided in the active mode, the data line has been inactive;
 transmit from a transmitting component inaccurate frame synchronization data for a first frame transmitted once the clock signal is provided in the active mode, wherein the inaccurate frame synchronization data for the first frame, as received by the component, does not match expected frame synchronization data, wherein a difference between the inaccurate frame synchronization data and the expected frame synchronization data is caused by the transmitting component failing to transmit a toggle signal on the data line; and transmit from the transmitting component payload data as part of the first frame to the component, wherein the payload data is expected to be successfully read by the component.

18. The non-transitory computer-readable medium of claim 17, wherein the instructions configured to cause the processor to transmit from the transmitting component the inaccurate frame synchronization data for the first frame comprises instructions configured to cause the processor to transmit only a second bit, a third bit, and a fourth bit of the expected frame synchronization data.

19. The non-transitory computer-readable medium of claim 17, wherein a synchronization tolerance of SLIMbus permits incorrect frame synchronization data to be received by the component and the payload data of the frame to be processed.

20. The non-transitory computer-readable medium of claim 17, wherein the clock signal in the active mode is provided by a framer of the processor.

21. The non-transitory computer-readable medium of claim 17, wherein the instructions further comprise instructions configured to cause the processor to:

determine data to be transmitted to the component is present within a message buffer of the processor, wherein providing the clock signal in the active mode, via the clock line, to the component communicatively coupled with the SLIMbus occurs at least partially due to determining data is present within the message buffer.

22. The method for restarting data transmission on the SLIMbus of claim 1, wherein the payload data is expected to be successfully read by the component only if accurate frame synchronization data is transmitted for a second frame transmitted once the clock signal is provided in the active mode, wherein the accurate frame synchronization data for the second frame, as received by the component, does match the expected frame synchronization data.

23. The system configured for restarting data transmission on the SLIMbus of claim 7, wherein the payload data is expected to be successfully read by the component only if accurate frame synchronization data is transmitted for a second frame transmitted once the clock signal is provided in the active mode, wherein the accurate frame synchronization data for the second frame, as received by the component, does match the expected frame synchronization data.

24. The apparatus for restarting data transmission on the SLIMbus of claim 12, wherein the payload data is expected to be successfully read by the component only if accurate frame synchronization data is transmitted for a second frame transmitted once the clock signal is provided in the active mode, wherein the accurate frame synchronization data for the second frame, as received by the component, does match the expected frame synchronization data.

* * * * *